(12) United States Patent
Shmuylovich et al.

(10) Patent No.: US 8,209,354 B1
(45) Date of Patent: Jun. 26, 2012

(54) TRANSACTION LIFECYCLE MANAGEMENT IN DISTRIBUTED MANAGEMENT SYSTEMS

(75) Inventors: Samuil Shmuylovich, Framingham, MA (US); Dongjun Sun, Marlborough, MA (US); Anoop George Ninan, Milford, MA (US); Boris Farizon, Westborough, MA (US); Benjamin Thrift, Reston, VA (US); John Young, Fernandina Beach, FL (US); Nigel Hislop, Springfield, VA (US)

(73) Assignee: EMC Corporation, Hopkinton ( * ) Notice: Subject to any disclaimer, the term of this patent is extended or adjusted under 35 U.S.C. 154(b) by 1723 days.

(21) Appl. No.: 11/169,463

(22) Filed: Jun. 29, 2005

(51) Int. Cl.
*G06F 7/00* (2006.01)
*G06F 17/30* (2006.01)

(52) U.S. Cl. ......... 707/799; 707/812; 707/959; 719/314
(58) Field of Classification Search .................. 707/799, 707/812, 959; 719/314
See application file for complete search history.

(56) References Cited

U.S. PATENT DOCUMENTS

| | | | |
|---|---|---|---|
| 5,978,770 A * | 11/1999 | Waytena et al. | 705/5 |
| 6,598,174 B1 * | 7/2003 | Parks et al. | 714/6 |
| 2004/0093371 A1 * | 5/2004 | Burrows et al. | 709/201 |

OTHER PUBLICATIONS

Priority queue, Wikipedia, the free encyclopedia, http://web.archive.org/web/20040803013015/http://en.wikipedia.org/wiki/Priority_queue, May 2004.*
The American Heritage Dictionary of the English Language, Houghton Mifflin Company, Fourth Edition, 2000, 1 page.*

* cited by examiner

*Primary Examiner* — Phong Nguyen
(74) *Attorney, Agent, or Firm* — Krishnendu Gupta; Gerald P. Kazanjian

(57) ABSTRACT

A method and apparatus for managing a transaction in a storage area network is presented. A request is received from an agent process at a management server. The management server provides a ticket relating to the request. The ticket is sent to the agent process. The management server identifies a storage process related to the ticket. The storage process contacts the agent process and receives the information from the agent process.

14 Claims, 5 Drawing Sheets

TRANSACTION LIFECYCLE MANAGEMENT IN DISTRIBUTED MANAGEMENT SYSTEMS

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems. Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a person) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Agent components execute on host computer systems such as servers within the storage area network to manage storage area network elements. As an example, there may be different respective agents specifically designed (e.g., coded) to remotely manage and control data storage systems, database applications, switches, and so forth. Agent components receive remote management commands from the server component and apply functionality associated with those management commands to the managed elements within the storage area network for which those agents are designated to manage. Agents are also responsible for periodically collecting configuration or management data concerning the storage area network elements that those agents are responsible for management. Agents can transmit this collected management data back to a storage component. The storage component receives the collected management data from the agents and processes and stores this information into a storage area network management database for access by the server component. The console component can interact with the server component to obtain current information such as performance, capacity, load or other data concerning managed elements within the storage area network by accessing the element configuration data in the network management database.

Different components of the storage area network may be located remotely from each other. For example, the agents may be located remotely from the server and storage components, and communicate with them over a network. A firewall may be used on the network between the agent and other parts of the system. The firewall is used to provide a measure of security such that the server and storage components are not available (such as by having their IP addresses published) to other people or systems. A firewall may use Network Address Translation (NAT) wherein multiple private IP addresses are converted to a single IP address for communications outside of the local network, onto a public network. The impetus towards increasing use of NAT comes from a number of factors including a shortage of IP addresses, security needs and ease and flexibility of network administration.

A firewall placed between the local devices and the network is used to verify all traffic before allowing it to pass through. This means, for example, that no unauthorized user would be allowed to access the management server or storage processes. The firewall only allows connections that are originated on the inside network. This means, for example, that an internal client can connect to an outside server, but an outside client will not be able to connect to an internal server because it would have to originate the connection, and the firewall will not allow that. It is still possible to make some internal servers available to the outside world via inbound mapping, which maps certain well know TCP ports (e.g. 21 for FTP) to specific internal addresses, thus making services such as FTP or Web available in a controlled manner.

NAT can help network administration in several ways. NAT can be used to divide a large network into several smaller ones. The smaller parts expose only one IP address to the outside, which means that computers can be added or removed, or their addresses changed, without impacting external networks. With inbound mapping, it is even possible to move services (such as Web servers) to a different computer without having to do any changes on external clients.

The basic purpose of NAT is to multiplex traffic from the internal network and present it to an external network (e.g., the Internet) as if it was coming from a single computer having only one IP address. To multiplex several connections to a single destination, client computers label all packets with unique "port numbers". Each IP packet starts with a header containing the source and destination addresses and port numbers. This combination of numbers defines a single TCP/IP connection. The addresses specify the two machines at each end, and the two port numbers ensure that each connection between this pair of machines can be uniquely identified.

Each separate connection is originated from a unique source port number in the client, and all reply packets from the remote server for this connection contain the same number as their destination port, so that the client can relate them back to its correct connection.

A NAT gateway or firewall changes the source address on every outgoing packet to be its single public address. It also renumbers the source ports to be unique, so that it can keep track of each client connection. The NAT gateway uses a port mapping table to remember how it renumbered the ports for each client's outgoing packets. The port mapping table relates the client's real local IP address and source port plus its translated source port number to a destination address and port. The NAT gateway can therefore reverse the process for returning packets and route them back to the correct clients.

When any remote server responds to a NAT client, incoming packets arriving at the NAT gateway will all have the same destination address, but the destination port number will be the unique source port number that was assigned by the NAT. The NAT gateway looks in its port mapping table to determine which "real" client address and port number a packet is destined for, and replaces these numbers before passing the packet on to the local client.

This process is completely dynamic. When a packet is received from an internal client, NAT looks for the matching source address and port in the port mapping table. If the entry is not found, a new one is created, and a new mapping port allocated to the client. Because the port mapping table relates complete connection information—source and destination address and port numbers—it is possible to validate any or all of this information before passing incoming packets back to the client. This checking helps to provide effective firewall protection against Internet-launched attacks on the private LAN.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's ControlCenter (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction. The sizes of collected data range from a few kilobytes to several hundred megabytes. Processing these from as many agents as there are deployed can be complex, time-consuming and failure-prone. Executing these transactions reliably and efficiently are vital to the correct functioning of ECC. There are multiple distributed components that simultaneously participate in parallel processing of transactions. Transaction processing may fail for various reasons such as inconsistent data, malfunctioning components, network problems, and the like. Transaction processing failure prevents persisting data, which impedes storage management. Hence it is important to detect and identify the nature of these problems and to determine the possibility of recoverability from such problems. ECC employs a multi-tier state-based mechanism to track and manage each transaction through its lifecycle. Using this approach, transaction processing is achieved in a distributed and reliable manner. This enables improved supportability in ECC and automated recoverability of failed transactions where possible.

SUMMARY

Conventional mechanisms and techniques for managing the collection and processing of management data for managed entities within management applications suffer from a variety of deficiencies. In particular, the design of conventional storage area network management applications often uses a large number of agent components that each remotely operate to collect management data concerning the managed entities that those agents manage. Each agent is responsible for periodically transmitting the collected set of management and configuration data to a storage process that processes the management data for storage into a management database or other accessible management data repository. When a firewall is used between an agent and a server and storage component, accommodations must be made and maintained in order to permit the agent to forward its information to the storage component in order for the transaction to complete. Further, if a resource is added or moved, or has an address changed, the external network may be impacted. Placing the agent behind a firewall is a common solution to secure storage environment when storage management is done outside of a company.

Embodiments of the invention operate to significantly overcome these and other deficiencies associated with conventional mechanisms and techniques for processing of management data in a management application. In particular, embodiments of the invention provide a method of managing a transaction wherein a request for agent information is initiated by a storage process such that the agent provides the information in response to the request and can get through the firewall without special accommodations having to be made at the firewall, and without making the storage components' addresses public.

In a particular embodiment of a method for managing a transaction in a storage area network the method includes receiving a request from an agent process at a management server. A ticket relating to the request is provided by the management server and sent to the agent process. The management server then identifies a storage process related to the ticket. The storage process then initiates communication with the agent process and receives the information from the agent process.

Another embodiment comprises a storage area network including an agent, a storage component in communication with the agent, and a management server in communication with the storage component and the agent. The management server is capable of receiving a request from the agent and providing a ticket relating to the request to the agent. The management server further identifies a storage process related to the ticket. The storage component is capable of contacting the agent and receiving information from the agent.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method for managing a transaction in a storage area network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method for managing a transaction in a storage area network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
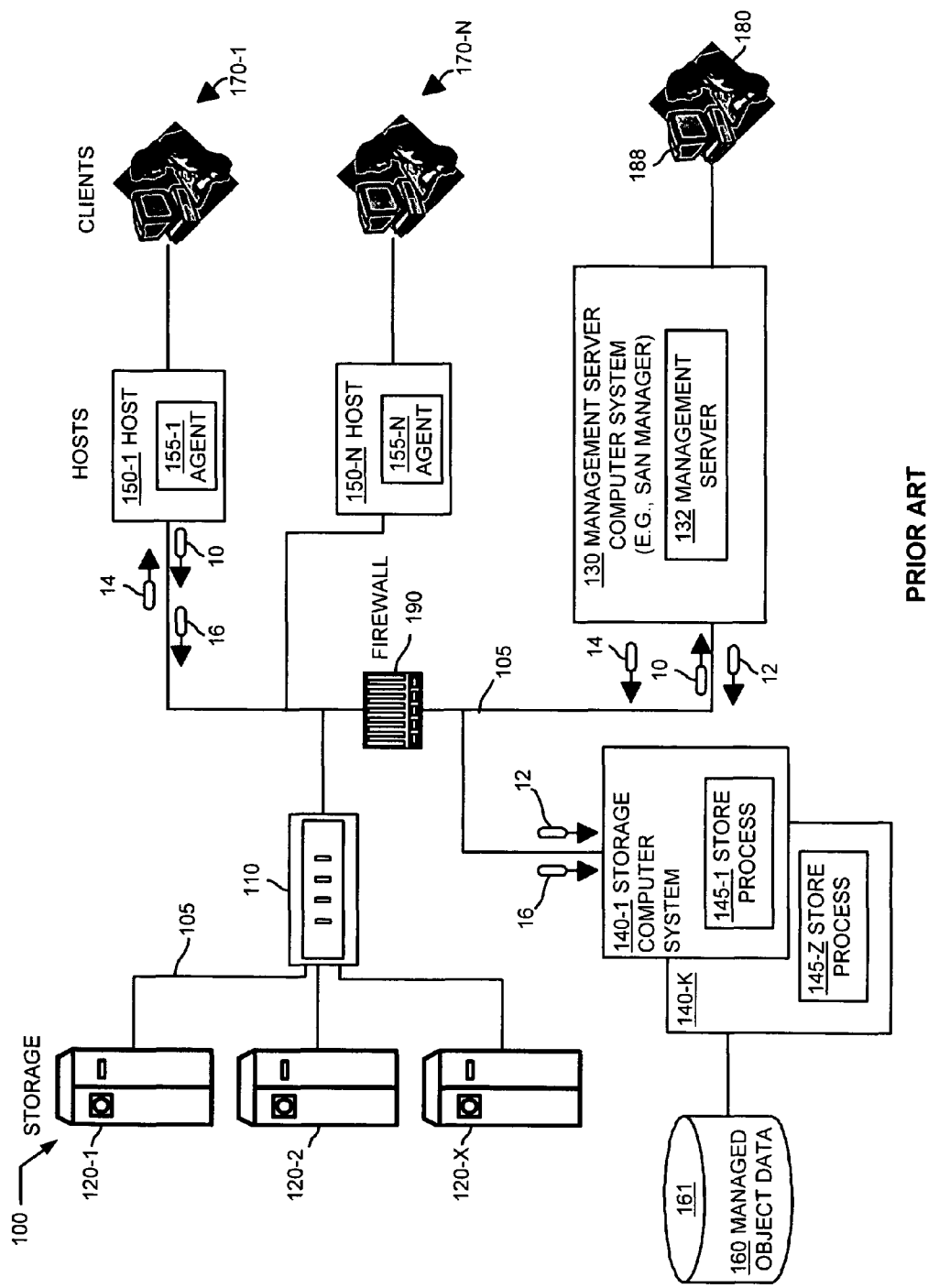
FIG. 1 illustrates an example prior art storage area network and computing system environment.
Figure 2:
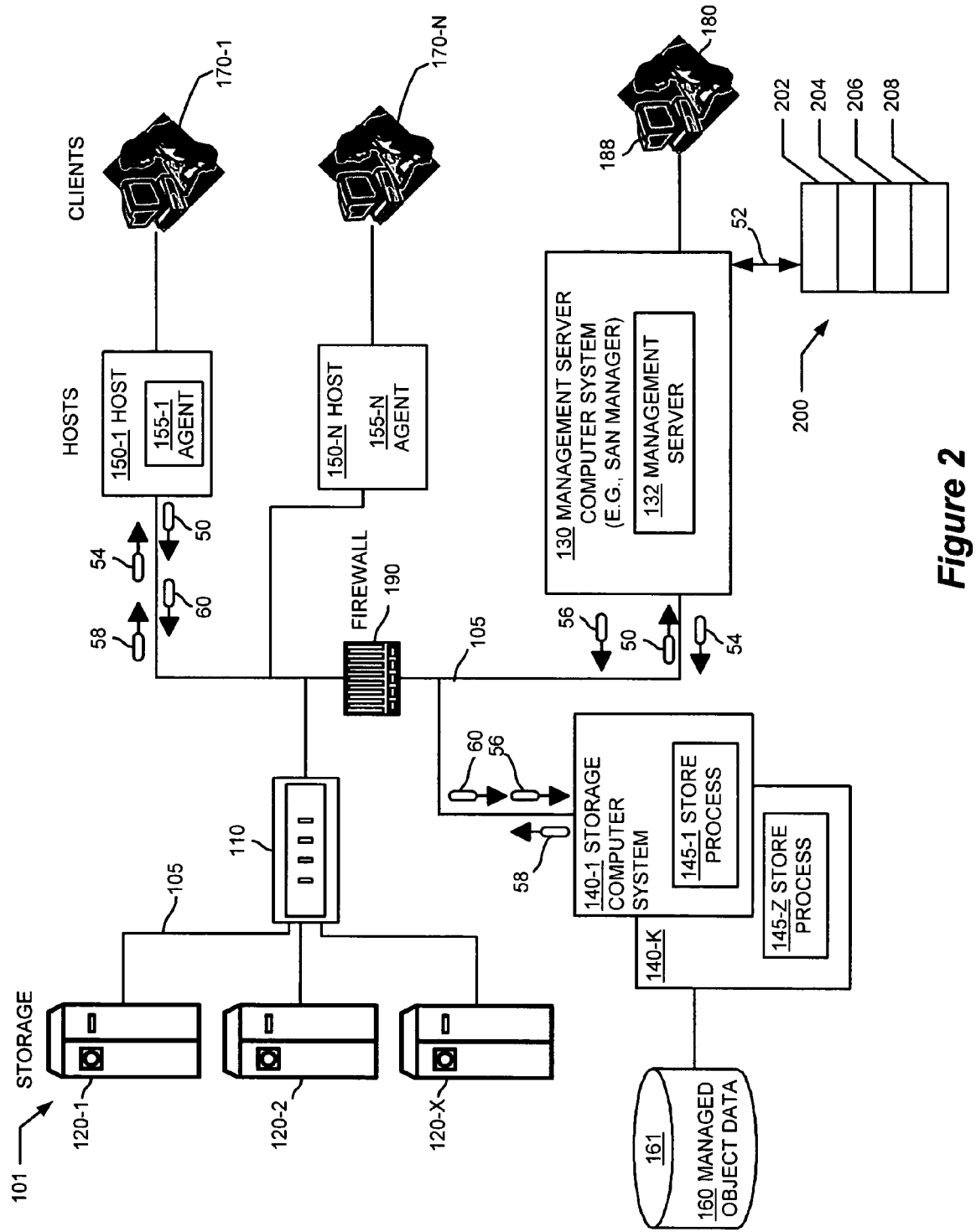
FIG. 2 illustrates an example storage area network and computing system environment configured to operate according to embodiments of the invention.

Referring now to FIGS. 1 and 2, in which like elements are shown having like reference designators, FIG. 1 illustrates an example of a prior art networking environment. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 150-1 through 150-M. According to the general operation of the storage area network shown in FIG. 1, client computer systems 170 can operate various client software applications (not specifically shown) that communicate with server applications (not specifically shown) operating within the host computer systems 150 in order to access data stored within the data storage systems 120 over the storage area network 100.

Also illustrated in this example storage area network 100 is a management server computer system 130 that operates a management server 132. In addition, the storage area network 100 includes one or more storage computer systems 140-1 through 140-K that, in this example, operate respective store processes 145-1 through 145-Z also configured in accordance with embodiments of the invention. A plurality of agent software processes 155-1 through 155-M operate within one or more of the host computer systems 150-1 through 150-M. Generally, the agents 155 and store processes 145 interoperate with, and are collectively considered parts of the management server 132. A network administrator 180 interacts via a console 188 (e.g., another computer system) with the management server 132 executing on the management server computer system 130 in order to remotely administer manageable entities within the storage area network 100 such as the data storage systems 120, the connectivity devices 110 and the host computer systems 150. Note that the console may be a process operating on the management server, a host or the storage computer system.

The agents 155 operate to periodically collect management data concerning specific managed entities associated with those agents 155. As an example, if the agent 155-1 is responsible for performing management functionality associated with one or more of the data storage systems 120, that agent 155-1 periodically queries or otherwise interacts with those data storage systems 120 for which it is assigned to manage in order to collect management data concerning the performance, configuration and/or other operational characteristics associated with those data storage systems 120. The management server 132 operates to allow the agents 155 to collect and transmit management data to a store process 145 operating within one of the storage computer systems 140 for processing into managed object data 160 for placement into a management database 161. The management server 132 is thereafter able to access (not specifically shown) the managed object data 160 within the management database 161 for interpretation and presentation to the network administrator 180 and for use in other management purposes of managed entities within the storage area network 100.

Prior to storage of the management data 162 into the management database 161 however, the store processes 145 typically pre-process the management data for conversion into managed object data 160. This can involve conversion of raw text or string data into object data 160 for use within the database 161. There are numerous agents 155-1 through 155-N (e.g., N may be greater than several hundred or a thousand or more) that each periodically (and sometimes randomly or in response to certain events) collect and require transmission of management data to a store process 145 for placement as managed object data 160 into the management database 161.

Note that the illustrated example in FIG. 1 is simplified with a single administrator 180 and each store process 145 and each agent 155 operates individually on a respective separate storage or host computer system 140, 150. It is to be understood that this is not limiting to embodiments of the invention and there may be, for example, multiple administrators 180 as well as multiple agents 155 operating on a single host computer system 150. In addition, in an alternative configuration, there may be multiple store processes 145 operating on a single storage computer system 140, though such an arrangement may experience performance contention issues.

An example of a transaction operation will now be discussed. The transaction begins with management server 130 receiving the request from agents 155. This is shown by signal 10 emanating from agent 155 and being received at server 130. The management server 130 locates a store process 145 for communication with the agent as shown by signal 12. Next, the store process ID is forward to the agent 155 by the management server 130 as depicted by signal 14. At this point, the communications between the agent 155 and the management server 130 has taken place through firewall 190 however this is not an issue since the management server has its IP address made public. The agent 155 then contacts the store process 145 in order to provide the information to the store process. Here, the communication between the agent and the storage process is initiated by the agent 155, therefore in order for the agent to get through the firewall certain accommodations must be made at the firewall to allow this to take place. This may involve, for example, making the storage computers 140-1-140-*k* have their respective IP addresses public or otherwise allowing a hole in the firewall 190 for this transaction, either of which may be undesirable.

Referring now to FIG. 2 a similar network 101 as that of FIG. 1 is shown. In this environment 101, the transaction begins with server 130 receiving a request from an agent as shown by signal 50. This request also takes place through firewall 190. Next, the server generates a ticket 202 as shown by signal 52. The ticket may be realized as a state machine or similar type structure. In this particular embodiment, a queue 200 of tickets 202, 204, 206 and 208 are shown. The ticket 202 in this instance is forwarded to the agent 155, as shown by signal 54. By way of signal 56 the server 130 locates a store process 145 within a storage system (also referred to as a store component) 140 for this transaction. The store component then contacts agent 155 as shown by signal 58. Note that since this communication is initiated by the store process 145, the communication proceeds through the firewall 190 without requiring special accommodations. Next, the agent 155 responds to the communication 58 by sending information 60 to the store 145 through firewall 190. Since the operation was initiated by the store component, the response to the store component request takes place over the same connection and thus no special accommodations need be made at the firewall 190 to account for the agent 155 transmitting information to the store process 145.

In some embodiments a queue 200 is used to store multiple tickets. In certain circumstances the tickets in the queue can be prioritized. This prioritization can be based on the size of the data, the priority of the data (for example a user request for real-time data as opposed to scheduled results data) or similar criteria.

A ticket corresponds to a single transaction and the data set associated with the transaction. A ticket can be in one of the several states. A ticket is in the START state when a request has been received from an agent and the ticket is produced to track the request. A ticket can be in the INITIAL state, wherein the ticket ID has been returned to the agent. A storage component is not yet available to process the ticket. When a ticket has transitioned to the NEW state, an available store process has been assigned by the server to process the ticket, and a transaction progress log entry has been created. A ticket can also be in an ASSIGNED state. In this state the selected store process has registered the corresponding transaction progress (described below) log record associated with the ticket. Another state that a ticket may be in is known as an INPROGRESS state. In this state the transaction log record is in the PROCESSING state. A ticket is in the FINISHED state when the ticket has completed processing.

The store process performs transaction progress logging during processing of the data from the agent. A transaction process log record can be in one of several states. An INITIAL state is when the server has created an entry in the transaction log table with the assigned store process. A transaction is in the REGISTERED state when the store process has read a transaction log record that is in the INITIAL state. A transaction is in the PROCESSING state when a connection between the store process sand the agent has been established and the store process is beginning to receive and process data. A transaction can be in the REJECTED state when the store process refuses the request. A store process may refuse a request if the process is busy or otherwise unable to handle the request. A transaction can be in the ABORTED state when the store process fails to read or to commit all the data to the database for causes that prevent continuation of the transaction processing, however, an attempt can be made to process this transaction later. The ABORTED state is an exit state. The transaction may also be in a FINISHED state when the store process successfully commits all the data to the database or fails to do so which causes that should not be retried. The log contains the outcome of the processing (success or failure) and a message elaborating on the status. The FINISHED state is also an exit state. Once the transaction has completed, the data is processed for storage into the management database or other management data repository.

The transaction lifecycle management in distributed management systems also can handle certain error scenarios. When the agent cannot connect to the server, if the agent times out after reading a response, if the agent cannot parse the servers response, or during other types of communications errors during processing the agent may retry with a new request. This retrying can be done every T seconds, with T being configurable.

The agent may encounter a communication error when either sending data to the store or waiting for a response from the store. Upon the occurrence of an error, the agent will close the connection to the store and generate a new request.

In another scenario, an agent may receive a ticket ID that is currently part of another transaction. This can happen if the server decides to reassign the ticket to another store. The agent closes the existing connection and responds to the new ticket. The agent may also receive a request for a ticket which is unknown by the agent. In this situation, the agent replies with a "TICKET_NOT_KNOWN" error code and closes the connection to the store.

There may also be error conditions related to the store. For example, a store may fail to connect to the agent. The store will try up to N times, then log the transaction state as ABORTED and elaborate on the reason by way of a message. N is configurable.

The store may receive a "TICKET_NOT_KNOWN" response from the agent. In this case, the store will log the transaction state as FINISHED with the outcome set to FAILURE and elaborate on the reason in the form of a message.

Figure 3:
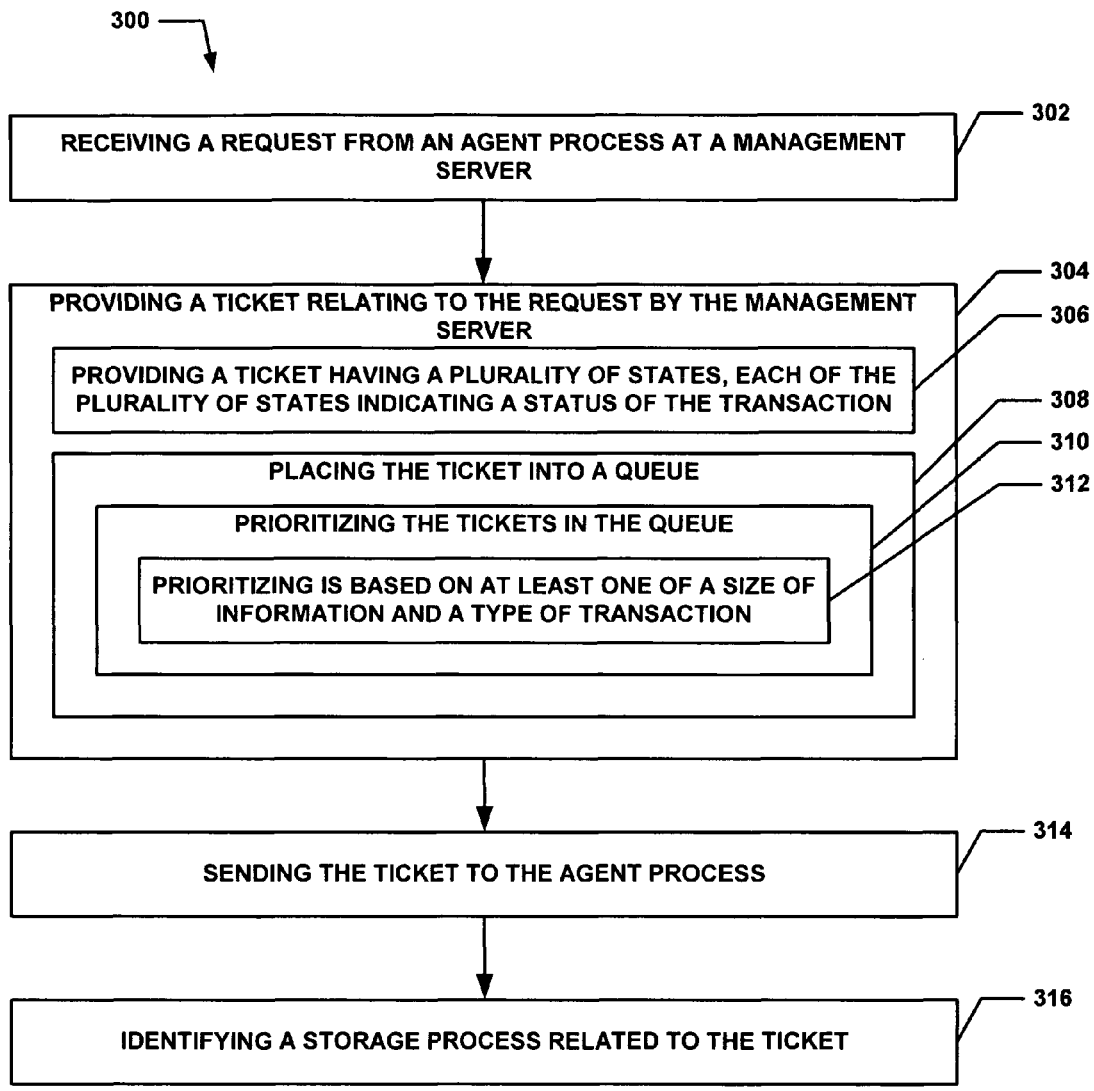
FIG. 3 is a flow chart of processing steps that show the general operation of a management server process according to embodiments of the invention.
Figure 4A:
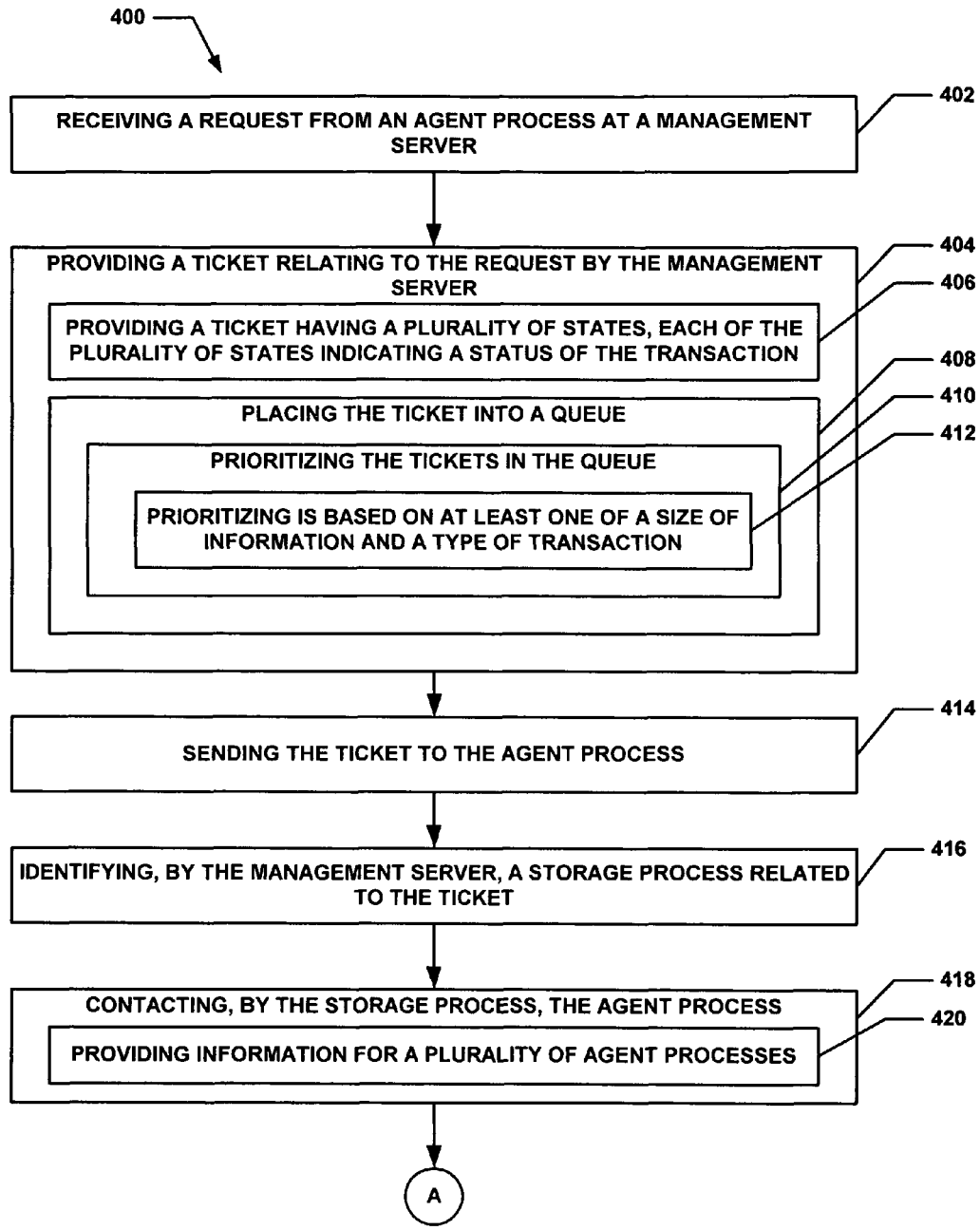
FIGS. 4A and 4B are a flow chart of processing steps that show the general operation of a transaction manager process according to embodiments of the invention.
Figure 4B:
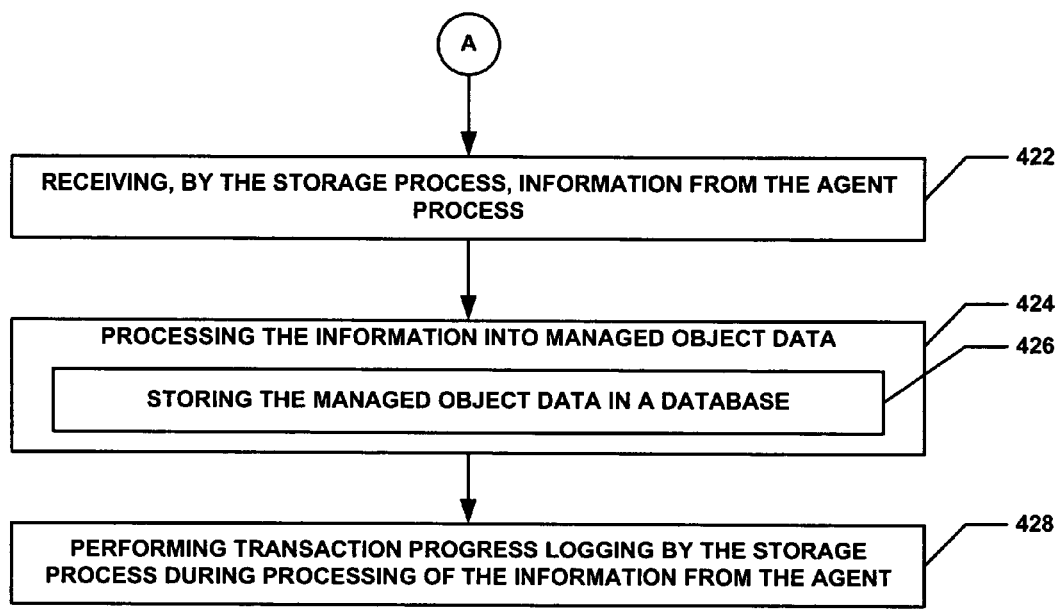

Flow charts of particular embodiment of the presently disclosed methods are depicted in FIGS. 3, 4A and 4B. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 300 for a management server to provide transaction processing is shown. The method 300 begins with processing block 302, wherein a request is received from an agent process. The request is regarding the transmittal of collected management data to a storage component.

In processing block 304, a ticket relating to the request is provided. Preferably the ticket is provide as a state machine, the state machine having multiple states, each state reflecting the status of the transaction, as shown in processing block 306. In processing block 308, in certain embodiments it may be desirable to place the ticket into a queue. As recited in processing block 310, the tickets in the queue may be prioritized, and as shown in processing block 312 the prioritization may be based on a size of information or a type of transaction.

In processing block 314 the ticket is sent to the agent process. In processing block 316 a storage process related to the ticket is identified, such that the storage process can receive information from said agent. In such a manner a management sever can provide transaction processing within a storage area network.

Referring now to FIGS. 4A and 4B, a method 400 for managing a transaction in a storage area network is shown. The method 400 begins with processing block 402, wherein a management server receives a request from an agent process. The request is regarding the transmittal of collected management data to a storage component.

In processing block 404, the management server provides a ticket relating to the request. Preferably the ticket is provided as a state machine, the state machine having multiple states, each state reflecting the status of the transaction, as shown in processing block 406. In processing block 408, in certain embodiments it may be desirable to place the ticket into a queue. As recited in processing block 410, the tickets in the queue may be prioritized, and as shown in processing block 412 the prioritization may be based on a size of information or a type of transaction.

In processing block 414 the management server sends the ticket to the agent process. In processing block 416 a storage process related to the ticket is identified by the management server, such that the storage process can receive information from the agent.

As shown in processing block 418 the storage process contacts the appropriate agent process. This communication may take place through a firewall without requiring special accommodations be made regarding getting through the firewall, since this communication is initiated by a device on the internal network. As shown in processing block 420, information regarding a plurality of agents may be provided during this communication.

In processing block 422, the storage process receives the information from the agent process. Since the initial communication was sent by the store process through the firewall, the response (which includes the information) takes place over the same connection, and thus is able to get through the firewall, without special accommodations being made at the firewall to account for the agent transmitting the information to the store process.

As recited in processing block 424, the received information is processed by the store process into managed object data. In processing block 426, the managed object data in stored in a database, where the management server and other devices can access it.

In processing block 428, transaction progress logging is performed by the storage process during processing of the information from the agent. Transaction process logging includes the state of the transaction processing and the log will contain the outcome of the processing and a message elaborating on the status of the transaction.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for managing a transaction in a storage area network comprising:
   receiving a request from an agent process at a management server;
   providing a ticket relating to said request by said management server;
   placing said ticket into a queue;
   prioritizing said tickets in said queue wherein said prioritizing is based on at least one of a size of information and a type of transaction;
   sending said ticket to said agent process;
   identifying, by said management server, a storage process within a storage system related to said ticket;
   contacting, by said storage process, said agent process; and
   receiving, by said storage process, information from said agent process.

2. The method of claim 1 further comprising processing said information into managed object data.

3. The method of claim 2 further comprising storing said managed object data in a database.

4. The method of claim 1 wherein said providing a ticket comprises providing a ticket having a plurality of states, each of said plurality of states indicating a status of said transaction.

5. The method of claim 1 further comprising performing transaction progress logging by said storage process during processing of said information from said agent.

6. The method of claim 1 wherein said contacting said agent process includes providing information for a plurality of agent processes.

7. A management server comprising:
a memory;
a processor;
a communications interface;
an interconnection mechanism coupling the memory, the processor and the communications interface; and
wherein the memory is encoded with a transaction management application that when performed on the processor, provides a transaction management process for processing information, the transaction management process causing the management server to perform the operations of:
receiving a request from an agent process;
providing a ticket relating to said request;
placing said ticket into a queue;
prioritizing said tickets in said queue based on at least one of a size of information and a type of transaction;
sending said ticket to said agent process; and
identifying a storage process within a storage system related to said ticket such that said storage process can receive information from said agent.

8. The management server of claim 7 wherein said performing the operation of providing a ticket includes providing a ticket having a plurality of states, each of said plurality of states indicating a status of said transaction.

9. A storage area network comprising:
an agent;
a storage component in communication with said agent; and
a management server in communication with said storage component and said agent, wherein said management server is capable of receiving a request from said agent, providing a ticket relating to said request to said agent, placing said ticket into a queue, prioritizing said tickets in said queue based on at least one of a size of information and a type of transaction; and identifying a storage process within a storage system related to said ticket, and wherein said storage component is capable of contacting said agent and receiving information from said agent.

10. The storage area network of claim 9 further comprising a firewall disposed between said agent and said storage component and said management server.

11. The storage area network of claim 9 further comprising a database in communication with said storage component.

12. The storage area network of claim 9 further comprising a ticket queue in communication with said management server.

13. The storage are a network of claim 11 wherein said management server processes said information into managed object data and stores said managed object data in said database.

14. The storage area network of claim 11 wherein said storage component performs transaction progress logging of said information from said agent.

* * * * *